(12) United States Patent
Bortnikov et al.

(10) Patent No.: US 10,510,017 B2
(45) Date of Patent: Dec. 17, 2019

(54) METHOD FOR APPROXIMATE K-NEAREST-NEIGHBOR SEARCH ON PARALLEL HARDWARE ACCELERATORS

(71) Applicant: Oath Inc., New York, NY (US)

(72) Inventors: Edward Bortnikov, Haifa (IL); Alexander Libov, Haifa (IL); Ohad Shacham, Kfar Monash (IL)

(73) Assignee: Oath Inc., New York, NY (US)

( * ) Notice: Subject to any disclaimer, the term of this patent is extended or adjusted under 35 U.S.C. 154(b) by 648 days.

(21) Appl. No.: 14/945,221

(22) Filed: Nov. 18, 2015

(65) Prior Publication Data

US 2017/0140012 A1 May 18, 2017

(51) Int. Cl.
| | | |
|---|---|---|
| *G06F 17/30* | (2006.01) | |
| *G06N 20/00* | (2019.01) | |
| *G06F 17/10* | (2006.01) | |
| *G06K 9/00* | (2006.01) | |
| *G06K 9/62* | (2006.01) | |
| *G06F 16/903* | (2019.01) | |

(52) U.S. Cl.
CPC ....... *G06N 20/00* (2019.01); *G06F 16/90335* (2019.01); *G06F 17/10* (2013.01); *G06K 9/00* (2013.01); *G06K 9/00973* (2013.01); *G06K 9/622* (2013.01); *G06K 9/6276* (2013.01)

(58) Field of Classification Search
CPC ...... G06N 99/005; G06N 20/00; G06F 17/10; G06F 17/30979; G06F 16/90335; G06K 9/00; G06K 9/00973; G06K 9/622; G06K 9/6276
See application file for complete search history.

(56) References Cited

U.S. PATENT DOCUMENTS 5,274,805 A * 12/1993 Ferguson .................. G06F 7/24
7,383,247 B2 * 6/2008 Li ...................... G06F 17/30967
(Continued)

OTHER PUBLICATIONS

Jégou, Hervé et al., "Product Quantization for Nearest Neighbor Search," IEEE Transactions on Pattern Analysis and Machine Intelligence, Institute of Electrical and Electronics Engineers, 2011, 33 (1), pp. 117-128 <10.1109/TPAMI.2010.57>. <inria-00514462v2>.

(Continued)

*Primary Examiner* — Jared M Bibbee
(74) *Attorney, Agent, or Firm* — Cooper Legal Group, LLC

(57) ABSTRACT

In one embodiment, a processor of a computing device receives a query. The computing device may compare a centroid of each of a plurality of clusters to the query such that a subset of the plurality of clusters is selected, each of the plurality of clusters having a set of data points. An assignment of the subset of the plurality of clusters may be communicated to a hardware accelerator of the computing device. A plurality of threads of the hardware accelerator of the computing device may generate one or more distance tables that store results of intermediate computations corresponding to the query and the subset of the plurality of clusters. The distance tables may be stored in shared memory of the hardware accelerator. A plurality of threads of the hardware accelerator may determine a plurality of data points using the distance tables. The processor may provide query results pertaining to at least a portion of the plurality of data points.

22 Claims, 6 Drawing Sheets

(56) References Cited

U.S. PATENT DOCUMENTS

| | | | | |
|---|---|---|---|---|
| 8,185,867 | B2* | 5/2012 | Robinson | G06F 8/00 717/105 |
| 8,352,494 | B1* | 1/2013 | Badoiu | G06F 17/30256 707/772 |
| 8,688,683 | B2* | 4/2014 | Simon | G06F 17/30463 707/713 |
| 8,761,512 | B1* | 6/2014 | Buddemeier | G06K 9/6282 382/181 |
| 9,131,241 | B2* | 9/2015 | Ji | H04N 19/61 |
| 2002/0078023 | A1* | 6/2002 | Lawton | G06F 17/30864 |
| 2003/0018630 | A1* | 1/2003 | Indeck | G06F 17/30477 |
| 2006/0224563 | A1* | 10/2006 | Hanson | G06F 17/30463 |
| 2007/0169059 | A1* | 7/2007 | Halambi | G06F 8/4452 717/160 |
| 2007/0277036 | A1* | 11/2007 | Chamberlain | G06F 3/061 713/171 |
| 2008/0183688 | A1* | 7/2008 | Chamdani | G06F 17/30442 |
| 2009/0210413 | A1* | 8/2009 | Hayashi | G06F 17/30241 |
| 2010/0005077 | A1* | 1/2010 | Krishnamurthy | G06F 17/30463 707/E17.136 |
| 2010/0088490 | A1* | 4/2010 | Chakradhar | G06F 8/45 712/34 |
| 2011/0167056 | A1* | 7/2011 | Khanolkar | G06F 17/30433 707/718 |
| 2012/0047126 | A1* | 2/2012 | Branscome | G06F 17/30519 707/714 |
| 2012/0079141 | A1* | 3/2012 | Ushiku | G06F 13/1652 710/26 |
| 2012/0084543 | A1* | 4/2012 | Pross | G06F 9/3881 713/1 |
| 2014/0351239 | A1* | 11/2014 | Davis | G06F 17/30483 707/718 |
| 2015/0206285 | A1* | 7/2015 | Pajak | G06T 5/002 382/265 |
| 2015/0254294 | A1* | 9/2015 | Marais | G06F 11/073 707/690 |
| 2016/0055611 | A1* | 2/2016 | Manevitch | G06T 1/20 345/501 |
| 2016/0132329 | A1* | 5/2016 | Gupte | G06F 9/4887 718/103 |
| 2017/0109056 | A1* | 4/2017 | Gopal | G06F 3/0608 |

OTHER PUBLICATIONS

Kalantidis, Yannis et al., "Locally Optimized Product Quantization for Approximate Nearest Neighbor Search," IEEE, Proceedings of Internatinal Conference on Computer Vision and Pattern Recognition (CVPR 2014), Jun. 2014.

Garcia, Vincent et al., "Fast k nearest neighbor search using GPU," Feb. 14, 2013, downloaded from http://vincentfpgarcia.github.io/kNN-CUDA.

Garcia, Vincent et al., "Fast k nearest neighbor search using GPU," Proceedings of the CVPR Workshop on Computer Vision on GPU, Anchorage, Alaska, Jun. 2008.

Garcia, Vincent et al., "K-nearest neighbor search: fast GPU-based implementations and application to high-dimensional feature matching," Proceedings of the IEEE International Conference on Image Processing (ICIP), Hong Kong, China, Sep. 2010.

* cited by examiner

METHOD FOR APPROXIMATE K-NEAREST-NEIGHBOR SEARCH ON PARALLEL HARDWARE ACCELERATORS

BACKGROUND OF THE INVENTION

The disclosed embodiments relate generally to methods and apparatus for performing a nearest neighbor search using a hardware accelerator.

Nearest neighbor search (NNS) is an optimization problem for finding the closest (or most similar) data points to a query point, where each data and query point represents an object such as a photograph. Closeness is typically expressed in terms of a dissimilarity function: the less similar the objects, the larger the function values. Data points are often represented as d-dimensional vectors, where dissimilarity is measured using a distance metric such as the Euclidean distance.

There are numerous variants of the NNS problem. The two most well-known variants are the k-nearest neighbor search (kNN) and the approximate nearest neighbor search. A kNN search identifies the top k nearest neighbors to the query. An approximate nearest neighbor search is not guaranteed to provide the actual nearest neighbors in every case, in return for improved speed or memory savings.

The nearest neighbor search problem arises in numerous fields of application. Typically, modern products and technologies implement kNN search on traditional central processing units (CPUs).

SUMMARY OF THE INVENTION

In one embodiment, a processor of a computing device receives a query. The computing device may compare a centroid of each of a plurality of clusters to the query such that a subset of the plurality of clusters is selected, each of the plurality of clusters having a set of data points. An assignment of the subset of the plurality of clusters may be communicated to a hardware accelerator of the computing device. A plurality of threads of the hardware accelerator may generate one or more distance tables that store results of computations corresponding to the query and the subset of the plurality of clusters. The distance tables may be stored in shared memory of the hardware accelerator. A plurality of threads of the hardware accelerator may determine a plurality of data points using the distance tables. The processor may provide query results pertaining to at least a portion of the plurality of data points.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
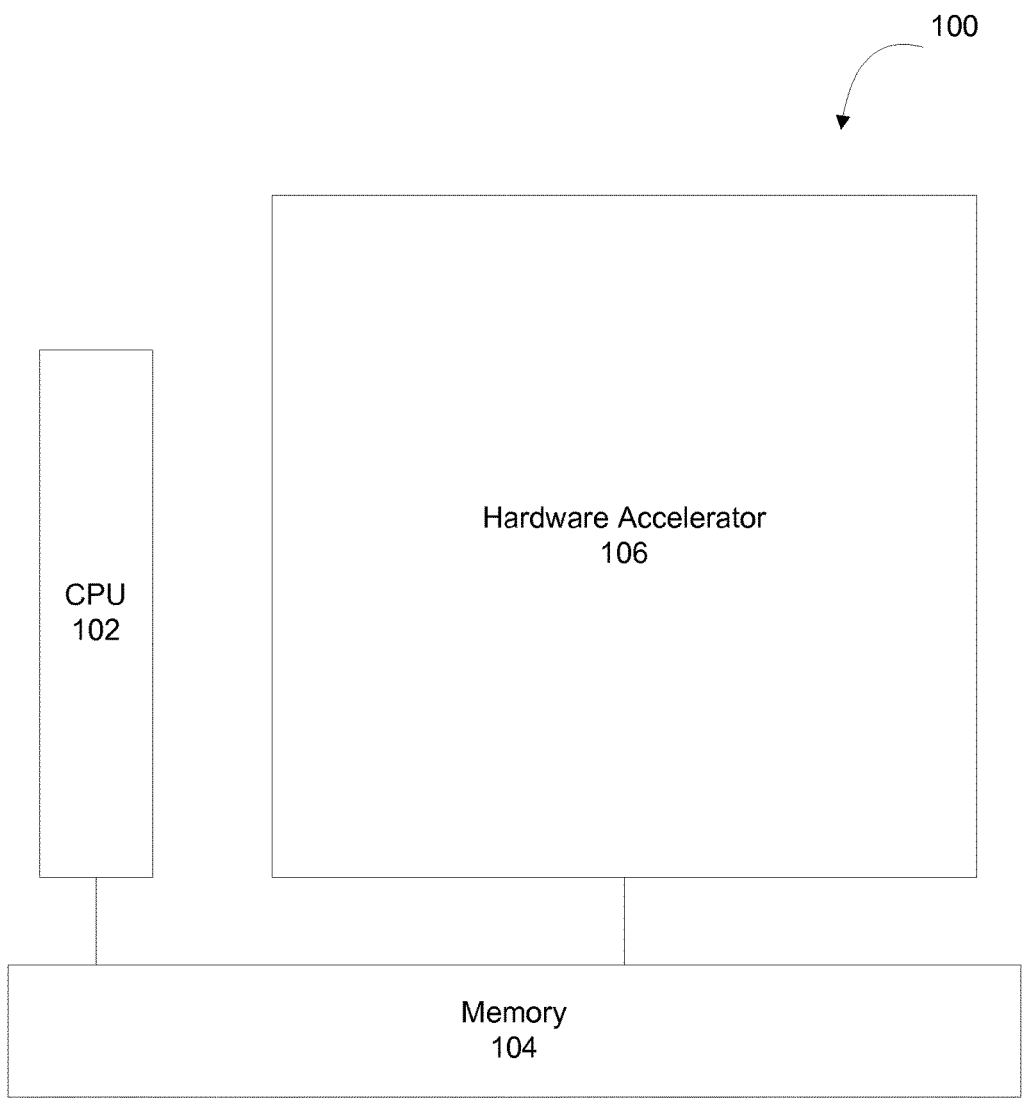
FIG. 1 is a diagram illustrating an example computing device in which various embodiments may be implemented.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the disclosed embodiments. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The nearest neighbor search (NNS) is relevant in a variety of computing contexts. For example, a user may submit a query to find other images that are similar to a particular image or to identify an object represented within the image. As another example, a user may submit a query to identify the k nearest neighbors to a particular deoxyribonucleic acid (DNA) sequence. Therefore, the NNS problem may be relevant to retrieval of search results that are similar to a query, as well as performing classification with respect to a query.

A data point representing an object such as a photograph, video segment, or DNA sequence often includes a sequence of numerical values, where each of the numerical values is an integer or floating point number. Typically, a data point is represented by a d-dimensional vector, where each component of the vector represents a different aspect or feature of an object represented by the data point. For example, a vector may represent different aspects of a photograph or DNA sequence data.

One way to perform a similarity search or classification for a query vector is to compute the distances between the unlabeled query vector and all stored examples (e.g., data points) in a data set. However, the computation of distances for large data sets is computationally intensive. By using a nearest neighbor search algorithm, the number of distance evaluations being performed may be reduced.

One nearest neighbor search algorithm is the k-Nearest Neighbors (kNN) algorithm. Using a kNN algorithm, the k nearest neighbors (e.g., data points) that are nearest to the query vector may be identified. The k nearest neighbors may be returned as query results or the query may be classified by assigning a label that is most frequent among the k nearest neighbors.

Typically, a nearest neighbor search algorithm such as a kNN search is executed by a general purpose processor. However, a general purpose processor executes instructions sequentially. Therefore, these implementations are time-consuming and provide sub-optimal results in real time.

Systems with multiple processing elements may operate in parallel. However, if different instructions are executed by each of the processing elements, a bottleneck on the memory bus through which the software code is accessed will result and execution will suffer. Moreover, if the same instructions are executed while randomly accessing segments in memory, there will be collisions during memory access.

To operate efficiently, computations may be performed in parallel by performing single instruction, multiple data (SIMD) execution. SIMD describes systems with multiple processing elements that perform the same operation on multiple data points simultaneously. In other words, these systems operate in parallel at the data level to perform computations simultaneously (e.g., in parallel). SIMD only supports the application of a single instruction at a given moment, where memory access by the different processing elements is aligned rather than random.

It is possible to perform some functions faster than is possible in software running on a more general-purpose central processing unit (CPU) through the use of computer hardware. The hardware that performs this acceleration may be referred to as a hardware accelerator. Through the use of a hardware accelerator, multiple software instructions may be executed in parallel.

FIG. 1 is a diagram illustrating an example computing device in accordance with various embodiments. As shown in this example, a computing device 100 may include one or more processors such as a central processing unit (CPU) 102, which may be coupled to memory 104. The memory represents one or more storage devices, which may include random access memory (RAM) and read-only memory (ROM). The CPU 102 may be of various types including microcontrollers and microprocessors such as programmable devices (e.g., CPLDs and FPGAs) and unprogrammable devices such as gate array ASICs or general purpose microprocessors.

A mass storage device (not shown) such as a CD-ROM, which may also be coupled bi-directionally to the CPU 102, may store programs, data and the like. The CPU 102 may also be coupled to an interface (not shown) that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices. Finally, the CPU 102 may be coupled to an external device such as a database or a computer or telecommunications network using an external connection. With such a connection, it is contemplated that the CPU might receive information from the network, or might output information to the network in the course of performing the method steps described herein.

In addition, the computing device 100 may include one or more hardware accelerators (HA) 106. Generally, a hardware accelerator is an electronic circuit that facilitates the concurrent, parallel execution of software instructions through the use of multiple processing elements. Such an electronic circuit may be specifically designed for a variety of systems and applications. The electronic circuit may include a number of transistors that are implemented in a computer chip. One example of a hardware accelerator is a graphics processing unit (GPU).

A hardware accelerator such as a GPU is designed such that a majority of the transistors are devoted to data processing rather than data caching and flow control. A hardware accelerator typically includes global memory, shared memory, and multiple processing elements (e.g., multiprocessors). Shared memory is generally implemented within the hardware accelerator, while the global memory need not be implemented within the hardware accelerator. It is possible to perform SIMD execution by accessing the global memory in a manner such that memory access by multiple processing elements is aligned at different offsets. However, the shared memory may be accessed in a random fashion. As will be described in further detail below, the disclosed embodiments exploit the ability to randomly access the shared memory of a hardware accelerator to perform a kNN search.

Figure 2:
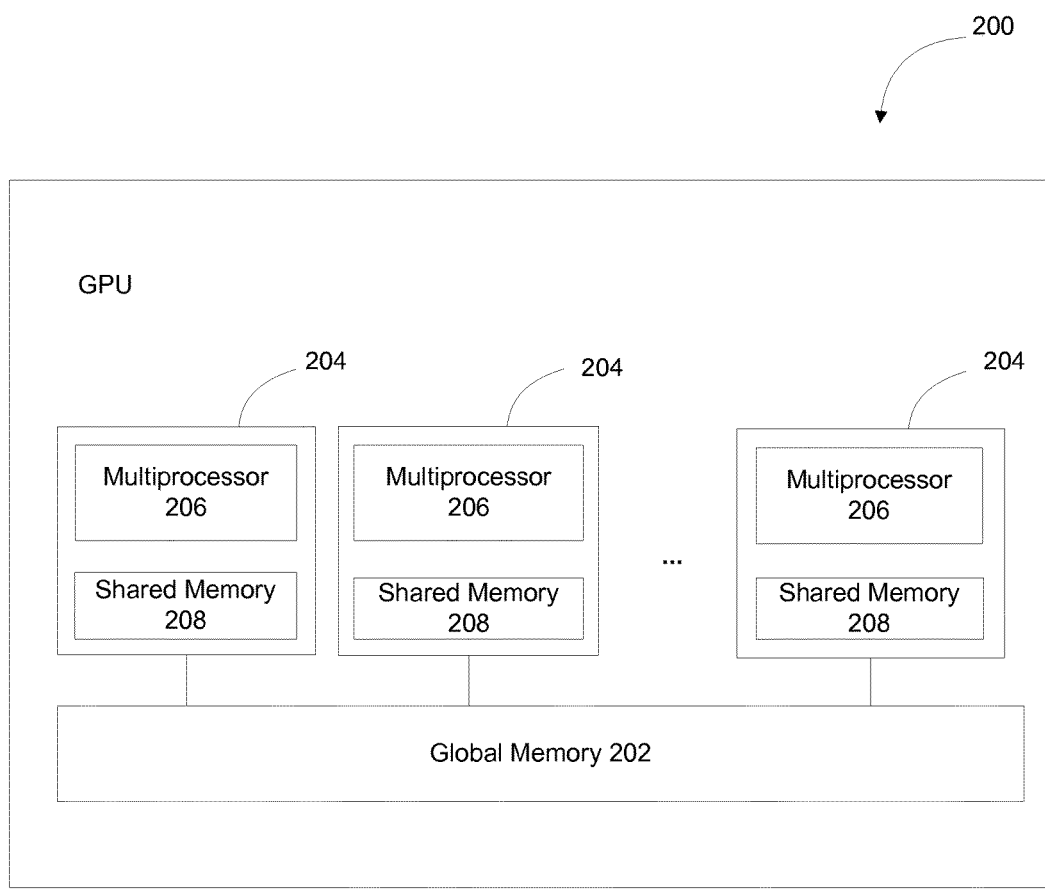
FIG. 2 is a diagram illustrating an example hardware accelerator in which various embodiments may be implemented.

FIG. 2 is a diagram illustrating an example hardware accelerator in accordance with various embodiments. As shown in this example, a hardware accelerator 200 such as a GPU may include global memory 202 and multiple blocks 204, where each block 202 includes a multiprocessor 206 and shared memory 208. For example, the shared memory 208 may include Random Access Memory (RAM). Generally, the RAM of a hardware accelerator is smaller than the RAM of the host computing device. Therefore, it is desirable to maximize the amount of data that may be stored in the shared memory of the hardware accelerator.

Within each block 204, the multiprocessor 206 may execute multiple threads concurrently to randomly access the shared memory 208. Each block 204 may be identified by a block identifier, while threads within the block 204 may be identified by corresponding thread identifiers. Data that is stored within the global memory 202 is typically visible to all threads within an application. In contrast, data that is stored in the shared memory 208 is typically visible only to those threads within that block 204. Therefore, threads within a block 204 may communicate and share data between one another by storing intermediate results of computations in the shared memory 208.

To take advantage of the shared memory 208, data may be partitioned into subsets. More particularly, the data may be partitioned to enable the subsets or results of computations using the subsets to fit into the shared memory 208 of the blocks 204. Thus, each data subset may be processed with a corresponding thread block 204. More particularly, multiple threads of a block 204 may access the data subset from the global memory 202, and may load the data subset from the global memory 202 to the shared memory 208 of the block. Multiple threads may then perform computations on the global version of the data subset or the local version of the data subset in the shared memory 208 of the block. By storing a single data subset or results of computations associated with a single data subset in the shared memory 208, memory bandwidth may be reduced. Results obtained by the threads of the block 204 may be copied from the shared memory 208 to the global memory 202.

Prior to performing a kNN search, a data set including a plurality of data points may be partitioned into non-overlapping clusters. During the kNN search, a two-pass process may be employed to locate the k nearest neighbors. During the first pass, the query data point may be compared to a centroid (e.g., central data point) of each of the clusters to identify a subset of the clusters that are most relevant to the query data point. During the second pass, the subset of the clusters may be searched to identify the k nearest neighbors.

By reducing the number of clusters to be processed, the number of comparisons and corresponding computations is significantly reduced. However, where the dimension (e.g., the number of coordinates) of the vectors being processed is high, computing the distances between the vectors of the clusters and the query vector is still a costly process. In addition, the memory consumed by data points can be significant.

For high-dimensional data such as image data, video data, or DNA sequence data, dimension reduction is often performed prior to applying the nearest neighbor algorithm to avoid the effects of the curse of dimensionality. The curse of dimensionality in the kNN context means that Euclidean distance is unhelpful in high dimensions because all vectors are almost equidistant to the search query vector. Dimensionality of data may be reduced through quantization, as will be described in further detail below.

Offline Processing

In accordance with various embodiments, a data set may be partitioned into a plurality of clusters, where each cluster has a set of data points including a centroid. A centroid may be considered to be central to the data points in the corresponding cluster. For example, partitioning of the data set may be accomplished via k-means clustering. The results of the partitioning may be stored for retrieval during a subsequent kNN search.

In addition, data points within the data set may be compressed. In some embodiments, the data points of all of the clusters are compressed prior to performing the kNN search. In other embodiments, the data points of a selected subset of the clusters may be compressed at a later point.

In accordance with various embodiments, a data point in high dimension may be compressed to a compressed data point (e.g., binary value or code) in low dimension. This may be accomplished, at least in part, by performing product quantization according to a set of quantization parameters. For example, a first quantization parameter may specify a number of coordinates m in a compressed data point (e.g., code) and a second one of the quantization parameters may specify a subvector (e.g., band) length of the data point to which each of the coordinates corresponds. To compress a data point, the data point may be subdivided into a plurality of subvectors of the subvector length. The subvectors may be quantized such that a compressed data point having the number of coordinates is generated, where each of the coordinates of the compressed data point corresponds to one of the plurality of subvectors of the data point. Thus, each of the subvectors may be separately quantized. For example, each of the coordinates may correspond to a quantization index. In this manner, the subvectors of a data point may be mapped to the corresponding coordinates of a compressed data point (e.g., binary value or code).

Implementing a Nearest Neighbor Search Using a Hardware Accelerator

A hardware accelerator such as a GPU offers a much higher degree of parallelism compared to a CPU. However, transforming the CPU algorithm to run on a hardware accelerator is nontrivial due to potential bottlenecks.

In accordance with various embodiments, the kNN search may be parallelized by multiple threads of a hardware accelerator. In addition, distance tables representing intermediate computations pertaining to distances between the query point and data points in the subset of clusters may be stored in shared memory, enabling nearest neighbors to be identified by threads that access the distance tables in the shared memory.

Figure 3:
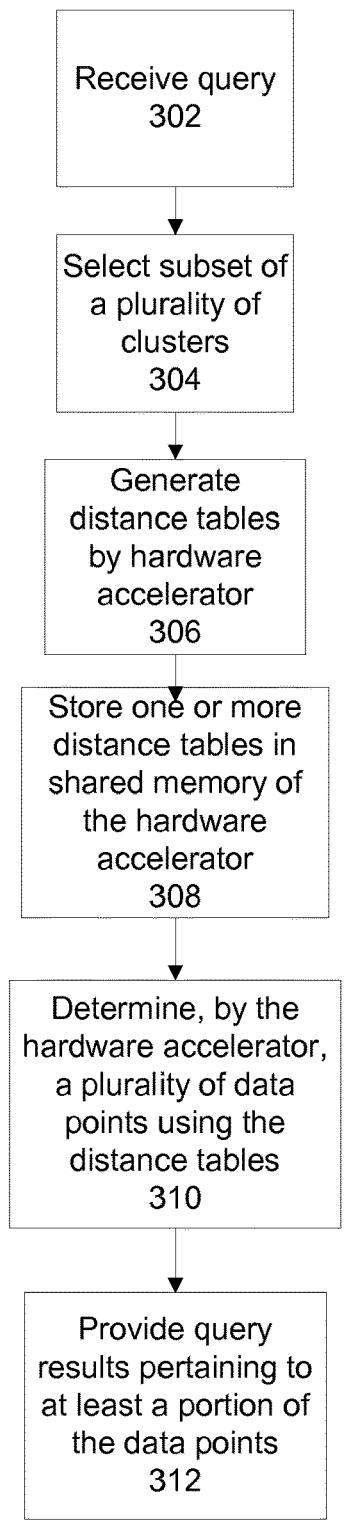
FIG. 3 is a process flow diagram illustrating an example method of performing a nearest neighbor search using a hardware accelerator.

FIG. 3 is a process flow diagram illustrating an example method of performing a nearest neighbor search on a hardware accelerator in accordance with various embodiments. The nearest neighbor search may be an exact or approximate kNN search. As shown at 302, a processor of a computing device may receive a query, which may be submitted via a network device or a user. For example, the query may include digital image data, video data, or DNA sequence data. The query may be represented by a corresponding numerical representation such as a vector of numerical values. For example, a query may include a digital file storing numerical values that together represent a digital image or DNA sequence.

In accordance with various embodiments, the query may be maintained in high dimension. In other words, the query vector need not be quantized. By maintaining the query as a high dimensional vector, the search quality may be improved. In other embodiments, the query may be quantized.

The computing device may compare a centroid of each of a plurality of clusters to the query at 304 such that a subset of the plurality of clusters is selected. More particularly, the computing device may ascertain the distance between the query and each of the cluster centroids to identify the subset of the clusters that are closest to the query. In some embodiments, the selection of the subset of the clusters may be performed via a brute force algorithm by a processor of the device. In other embodiments, the selection of the subset of the clusters may be performed, at least in part, by performing distance computations in parallel by multiple CPUs or blocks of the hardware accelerator. For example, single instruction, multiple thread (SIMT) may be applied by the multiprocessors of the hardware accelerator. Since each of the clusters has a single centroid, the number of centroids is small. Thus, it is possible to compare the query to the centroids in the original space.

The processor may communicate an assignment of the subset of the plurality of clusters to the hardware accelerator. In accordance with various embodiments, the processor assigns the subset of the clusters among a plurality of blocks of the hardware accelerator. For example, the processor may provide an assignment of one of the subset of the clusters to one of the blocks of the hardware accelerator.

As shown at 306, a plurality of threads of a hardware accelerator of the computing device may generate one or more distance tables that correspond to the query and the subset of the plurality of clusters of the data set. In accordance with various embodiments, each block of the hardware accelerator may generate a corresponding distance table or portion thereof. The distance tables may store intermediate and/or final results of computations corresponding to the query and the subset of the plurality of clusters (e.g., computations pertaining to the distances between the query and data points in the subset of the plurality of clusters).

The distance tables may be stored in the shared memory of the hardware accelerator at 308. For example, each block may generate its own distance table that corresponds to the cluster assigned to that block and store the distance table in the shared memory of the block. A plurality of threads of the block may concurrently update the distance table in parallel as the data points in the cluster are processed. The distance table may store results of intermediate and/or final computations corresponding to the query and the cluster. For example, the results of the final computations may indicate or specify distances between the query and each data point in the cluster.

The approximate distances between a query vector and data points of a cluster may be ascertained by performing an asymmetric distance computation (ADC) or a symmetric distance computation (SDC). Example methods of performing symmetric and asymmetric distance computations are described in Herve Jegou, Matthijs Douze, Cordelia Schmid. Product Quantization for Nearest Neighbor Search. IEEE Transactions on Pattern Analysis and Machine Intelligence, Institute of Electrical and Electronics Engineers, 2011, 33, (1), pp. 117-128, which is incorporated herein by reference in its entirety for all purposes.

A plurality of threads of the hardware accelerator may determine a plurality of data points using the distance tables at 310. Since the distance tables are stored in shared memory rather than global memory, each of the distance tables may be randomly accessed in parallel by multiple threads. In accordance with various embodiments, each block of the hardware accelerator may identify a set of nearest neighbors using the distance table for a corresponding cluster. More particularly, a block may identify data points within the cluster that are closest to the query and store information pertaining to its set of nearest neighbors in the shared memory of the block. The block may then communicate information pertaining to the set of nearest neighbors to the processor. For example, the block may notify the processor that it has completed processing of a cluster, and the processor may retrieve the information pertaining to the nearest neighbors for that cluster from the shared memory of the block. The information for each of the nearest neighbors may identify a data point and indicate a distance between the data point and the query.

The processor of the device may provide query results pertaining to at least a portion of the plurality of data points at 312. For example, the processor may sort the information pertaining to the plurality of data points to identify the k nearest neighbors. The k nearest neighbors or information pertaining to the k nearest neighbors may then be provided in response to the query. For example, the k most similar images or tag(s) associated with the k most similar images may be provided in response to an image search.

In accordance with various embodiments, the quantization parameters may be selected according to the size of the shared memory, enabling the distance tables that are generated to be stored in the shared memory of the hardware accelerator. More particularly, the quantization parameters may be selected to optimize the precision with which the kNN search may be performed while ensuring that an entire distance table for a cluster of data may be stored in the shared memory of a corresponding block. Thus, the quantization parameters may be specifically tailored to the memory constraints of the shared memory. The quantization parameters may be selected via a machine learning process, which may be trained offline using training data.

Example Embodiment

In one embodiment, Inverted Vector File Product Quantization (IVFPQ) may be implemented using a hardware accelerator such as a GPU. An example method of performing a nearest neighbor search using product quantization is described in "Product Quantization for Nearest Neighbor Search," by Herve Jegou, Matthijs Douze, and Cordelia Schmid.

In accordance with various embodiments, quantization parameters are selected such that each distance table will fit within the hardware accelerator shared memory constraints. As described above, the quantization parameters may indicate the length of each subvector and the number of coordinates m within a code representing the subvector. Thus, the manner in which vectors are compressed and therefore the size of each distance table may be determined based, at least in part, on the quantization parameters.

Quantization parameters may be learned by applying k-means on a learning set. First, k-means may be run on a learning set to cluster data in the learning set into k clusters, resulting in the assignment of training set vectors to the k clusters. Second, subvector centroids corresponding to subvectors of the training set vectors may be identified using k-means. More particularly, for each training set vector, a residual may be computed. Each residual may be split into m subvectors. For each of the subvectors, k-means may be run to identify centroids for the subvector clusters.

Figure 4:
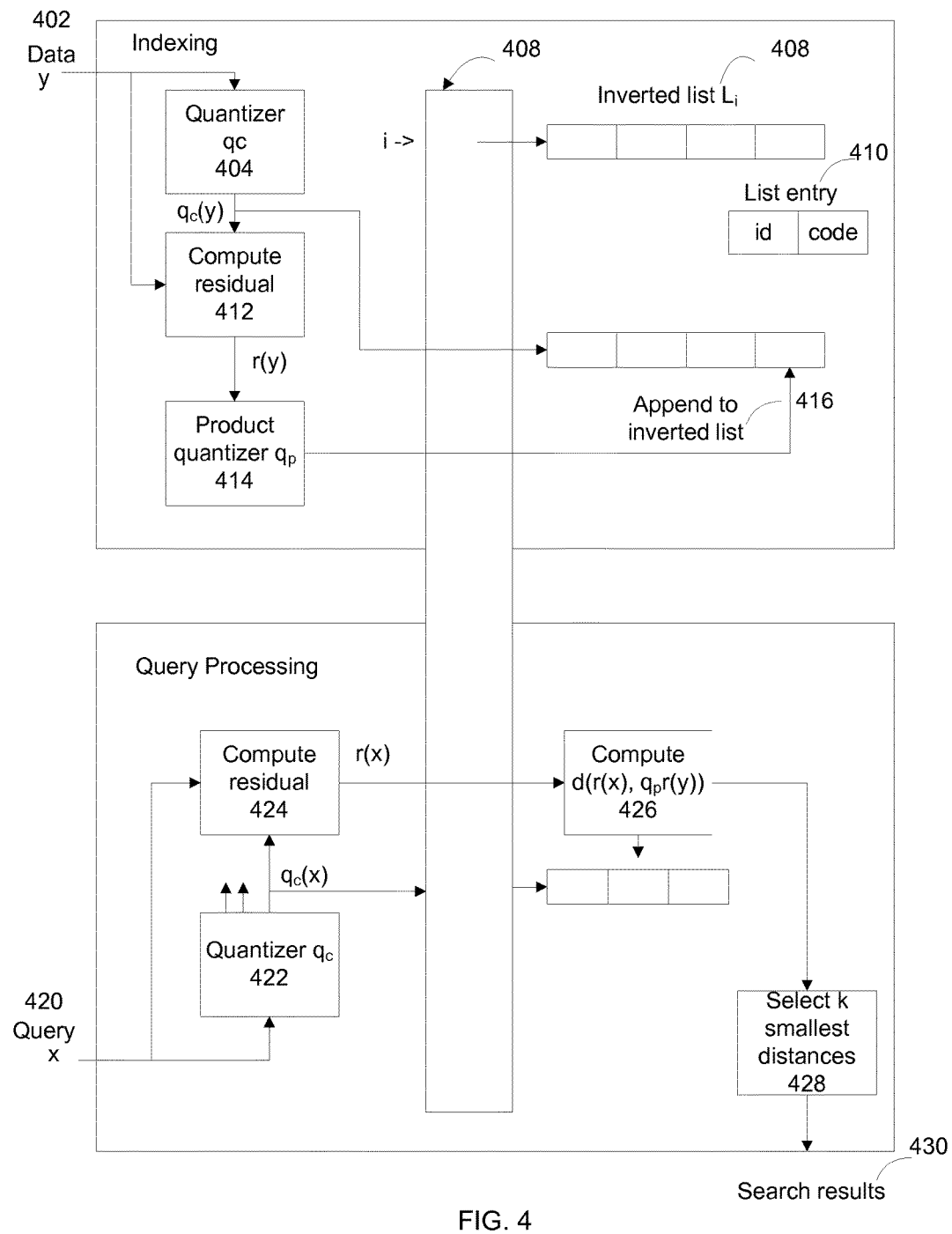
FIG. 4 is a diagram illustrating an example system in which various embodiments may be implemented.

FIG. 4 is a diagram illustrating an example system in which various embodiments may be implemented. Before a search may be performed on data in a database, data vectors y within the database may be encoded and indexed according to the quantization parameters. By encoding (e.g., compressing) the data vectors y, this reduces the dimensionality of the data being compared to the query and reduces the amount of the shared memory consumed during the kNN search. This indexing process may be performed offline.

Indexing of each data vector y within a database may be indexed, as will be described in further detail with reference to 402-416.

As shown in FIG. 4, a data point vector y 402 may be quantized at 404 into a corresponding code $q_c(y)$ (e.g., binary code or centroid), which may be stored in a data structure such as an inverted file structure 406. For example, the inverted file structure 406 may include an array of inverted lists 408. The code $q_c(y)$ for a data point y may be stored in a list entry 410 of an inverted list 408. For example, the list entry 410 may map an identifier of the data point vector y to the code $q_c(y)$, which may represent a centroid of a closest cluster to the data point vector y.

To enable the code $q_c(y)$ to be translated back to the original data point vector y, a residual vector r(y) for the data point vector y may be computed at 412 according to the formula $r(y)=y-q_c(y)$. The residual vector r(y) may be encoded by applying product quantization (PQ) to the residual vector r(y) at 414. For example, each subvector of the m subvectors of the residual vector r(y) may be separately quantized by one of m quantizers to a code $u_j$ that represents a centroid corresponding to the $j^{th}$ subvector of the residual vector r(y). Product quantization roughly preserves proximity between vectors while reducing vector dimension. By reducing the vector dimension, the shared memory of the hardware accelerator may be exploited. The result $q_p(r(y))$ may be appended to the inverted list 408, as shown at 416. Therefore, the data vector y 402 may be represented by a binary value, where the quantizer generates the code $q_c(y)$ that corresponds to the most significant bits and the product quantizer generates the code $q_p(r(y))$ that corresponds to the least significant bits.

In accordance with various embodiments, the inverted file may be stored in global memory of a hardware accelerator. During a search, a portion of the information in the inverted file or information computed using the portion of the information may be stored to shared memory. For example, segments of the inverted file may be used to generate distance tables that are stored in the shared memory of different blocks of the hardware accelerator.

A user may submit a query x at 420. A subset of the k data clusters that are closest to the query may then be selected. More particularly, the query may be quantized at 422 such that w clusters containing data points that are closest to the query are selected from k data clusters. As shown in this example, the query x may be quantized to its w nearest neighbors, $q_c(x)$. Each code $q_c(x)$ may represent a centroid of a corresponding cluster. In this manner, w of k data clusters may be selected.

The residuals r(x) associated with each of the w nearest neighbors may be computed at 424. More particularly, a residual vector r(x) for a particular cluster having a centroid q(x) may be determined according to the formula $r(x)=x-q(x)$. In accordance with various embodiments, the selection of w clusters and determination of residual vectors r(x) for the w clusters may be performed by a central processing unit (CPU).

The CPU may communicate an assignment of the w closest clusters to the hardware accelerator. More particularly, the CPU may communicate an assignment of a cluster to a corresponding multiprocessor or block of the hardware accelerator.

In accordance with various embodiments, the CPU may provide the residual vectors r(x) (i.e., residuals) and cluster assignments w (e.g., w nearest neighbors $q_c(x)$) to the hardware accelerator. More particularly, the CPU may provide a single residual r(x) and corresponding cluster assignment to a corresponding block. For example, the CPU may provide a residual vector r(x) and cluster assignment to each block of the hardware accelerator. The residual vector r(x) for a cluster and/or cluster assignment of the cluster may be copied to registers or the shared memory of the block that will be processing that cluster.

A search within the w closest clusters may be performed in parallel by a plurality of threads of the hardware accelerator. More particularly, the search of the w clusters may be performed by the plurality of blocks (e.g., all blocks) of the hardware accelerator. Each cluster in the selected subset of clusters may be processed by a corresponding block of the hardware accelerator. For example, data may be streamed in parallel to all threads processing the data. In one embodiment, each block of the hardware accelerator may obtain a residual r(x) for a cluster and compute distances for data points in the cluster using information retrieved by the block from the inverted file, as detailed below.

In accordance with various embodiments, the distance between a query x and a data point y may be approximated as the distance between the residual r(x) and the quantized residual $q_p r(y)$, which may be retrieved from the inverted file. As described above, $q_p r(y)$ may include an encoded value corresponding to the data point y, where the encoded value includes a representation of centroids $c_i$ corresponding to subvectors i of the residual vector r(y).

For each of the residuals r(x): 1) The distance between the residual r(x) and the quantized residual, $q_p r(y)$. may be computed at 426 by a corresponding block. More particularly, the squared distance $d(u_j(r(x)), c_{j,i})^2$ may be computed for each subquantizer j (of m sub-quantizers for the m subvectors) and each of its centroids $c_{j,i}$, where $u_j(r(x))$ represents a centroid corresponding to the $j^{th}$ subvector of the residual vector r(x). 2) The squared distance between r(x) and all the indexed vectors y of the sub-cluster within the inverted list may be computed. More particularly, using the subvector-to-centroid distances computed in step 1), this may include summing m looked-up values.

Threads of a block may perform the distance computations described in steps 1) and 2) and store intermediate and/or final results of the distance computations performed in step 1 and/or step 2 in the shared memory of the block. For example, each block may generate and store a distance table in the shared memory of the block, where the distance table is used to determine distances between the query x and each data point y in the cluster. In one embodiment, the distance table may store, for each subvector centroid, a distance between the subvector centroid and each of m subvectors. Thus, the number of rows and columns in the distance table may be determined by the number of subvector centroids and the number m subvectors. Therefore, the size of the distance table and the manner in which the distance table is generated may be determined, at least in part, on the quantization parameters that have been selected.

The distance table may be used by the multiple threads within the block to compute the distances between the query and the data points y in the cluster. More particularly, data points within the cluster may be divided among threads of the block for computation of the distances. Each thread within the block may compute the distances to its data points using the distance table, identify its own set of nearest neighbors (e.g., data points), and copy its nearest neighbors from registers to the shared memory. For example, the thread may perform an insertion sort to maintain its set of nearest neighbors. Each nearest neighbor may be associated with a particular data point and an associated distance.

Each block may identify its approximate n nearest neighbors based upon the distances associated with the sets of nearest neighbors determined by the threads within the block. For example, the block may maintain a data structure of fixed capacity that stores the n nearest neighbors having the smallest distance so far (and their associated distances), and a thread may add a data point or its identifier to the data structure only if its distance is below the largest distance in the data structure.

Once identified, each block may notify the CPU of its set of n nearest neighbors (e.g., data points and corresponding estimated distances). For example, the data structure maintained by the block or associated information may be copied to the CPU. In some embodiments, the data structure or associated information may be stored in the global memory of the hardware accelerator.

The CPU may select the k nearest neighbors of the query x from the data points (e.g., nearest neighbors) identified by the hardware accelerator at 428. More particularly, the CPU may sort the results obtained from the plurality of blocks of the hardware accelerator for the query to identify the k nearest neighbors. Search results pertaining to the k nearest neighbors to the query x may be provided at 430 by the processor. For example, the search results may be provided for presentation via a display of a client device.

While the example described above discloses the use of a single hardware accelerator (e.g., GPU), the disclosed embodiments may be applied to a system that includes multiple hardware accelerators. In this manner, it is possible to implement a kNN search for large high-dimensional data sets in an efficient manner.

The disclosed embodiments may be implemented in various applications including, but not limited to, pattern recognition, image similarity search, ad serving, DNA sequencing, plagiarism detection, and content recommendation. The disclosed embodiments may be implemented locally on a client device with respect to data stored on the client device or with respect to data that is accessed from data store(s) via a network. In addition, the disclosed embodiments may be implemented on a server such as a web server or search server that provides data to client devices over a network. An example network in which the disclosed embodiments may be implemented will be described in further detail below.

Network Environment

The disclosed embodiments may receive and respond to queries over a network. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Various embodiments may be implemented in a distributed system such as a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

In addition, the disclosed embodiments may be implemented in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 5:
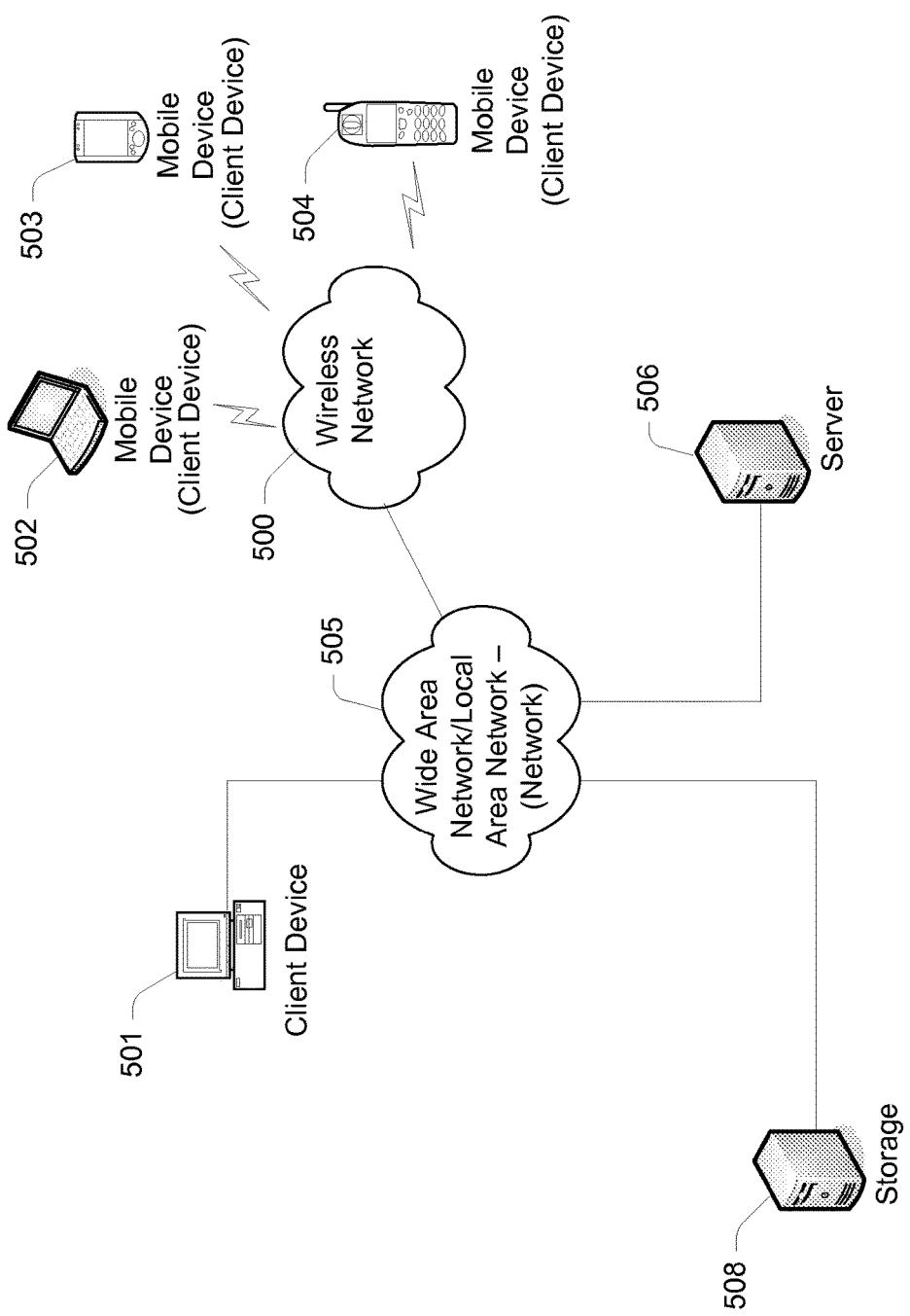
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network in which the disclosed embodiments may be implemented. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 505 and wireless network 500, a variety of devices, such as client devices 501-504, and a variety of servers 506 such as a web server and search server 506. The servers 506 and/or 507 may communicate with the client devices 501-504 or other network devices to provide information pertaining to data, which may be stored at the storage system 508. The servers 506 may also include a content server and/or ad server (not shown). The servers 506 may be associated with a web site such as a social networking web site. Examples of social networking web sites include Facebook, Tumblr, LinkedIn, Flickr, and Meme.

As shown in this example, the client devices 501-504 may include one or more mobile devices 502, 503, 504. Client device(s) 501-504 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

A search query may be transmitted by the client devices 501-504, as well as various network devices (e.g., servers) within the network. The identification and transmission of search results in response to a query may be implemented according to the disclosed embodiments in some centralized manner. This is represented in FIG. 5 by server(s) 506, which may correspond to multiple distributed devices and data store(s).

The servers may also enable a web site to provide a variety of services to its users. More particularly, users of the web site may maintain public user profiles, interact with other members of the web site, upload data including content such as media content (e.g., images such as photographs, videos), etc. In some embodiments, the web site may provide personalized content or services to users of the web site. Thus, results of a search query may be further personalized based upon user information. For example, aspects of the user information may be represented within a query vector that is processed in accordance with the disclosed embodiments. In addition, the web site may be a search engine provider.

The servers 506 may provide personalized content or services using information retained in user profiles. More particularly, the servers may have access to one or more user logs (e.g., user databases) into which user information is retained for users of the web site. The user information or a portion thereof may be referred to as a user profile. A user profile may include public information that is available in a public profile and/or private information. The user logs may be retained in one or more memories that are coupled to the servers.

The user information retained in the user logs may include personal information such as demographic information (e.g., age and/or gender) and/or geographic information (e.g., residence address, work address, and/or zip code). In addition, each time a user performs online activities such as clicking on an advertisement or purchasing goods or services, information regarding such activity or activities may be retained as user data in the user logs. For instance, the user data that is retained in the user logs may indicate the identity of web sites visited, identity of ads that have been selected (e.g., clicked on) and/or a timestamp. Moreover, information associated with a search query, such as search term(s) of the search query, information indicating characteristics of search results that have been selected (e.g., clicked on) by the user, and/or associated timestamp may also be retained in the user logs. A user may be identified in the user logs by a user ID (e.g., user account ID), information in a user cookie, etc.

Data that is processed using a kNN search as described herein may include various types of content. Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A computing device that is capable of sending or receiving signals, such as via a wired or wireless network, or capable of processing or storing signals, such as in memory as physical memory states, may operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of devices that may operate as a content server include desktop computers, multiprocessor systems, microprocessor-type or programmable consumer electronics, etc.

Client Device

Figure 6:
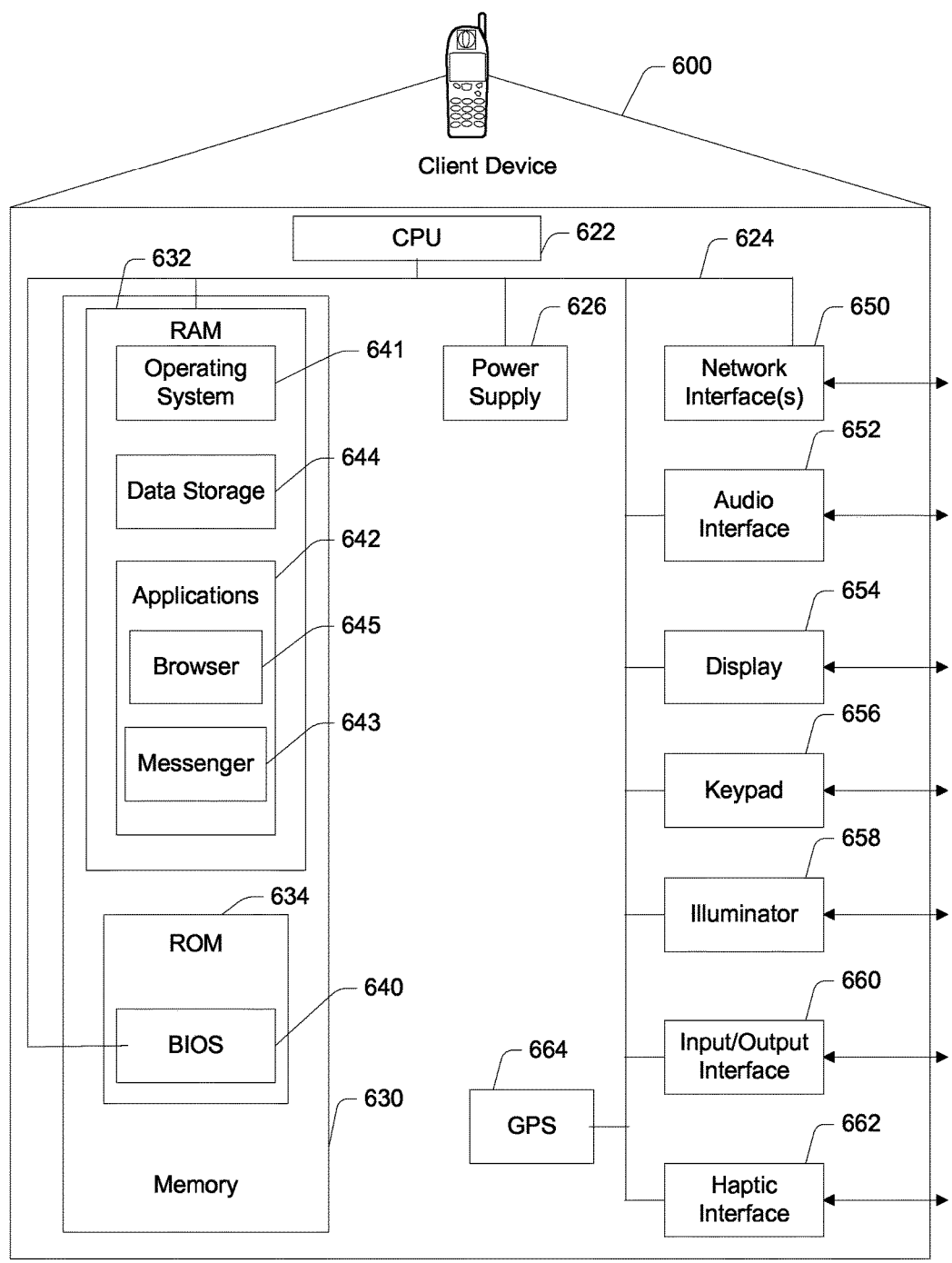
FIG. 6 is a schematic diagram illustrating an example client device.

FIG. 6 is a schematic diagram illustrating an example embodiment of a client device. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

As shown in this example, a client device 600 may include one or more central processing units (CPUs) 622, which may be coupled via connection 624 to a power supply 626 and a memory 630. The memory 630 may include random access memory (RAM) 632 and read only memory (ROM) 634. The ROM 634 may include a basic input/output system (BIOS) 640.

The RAM 632 may include an operating system 641. More particularly, a client device may include or may execute a variety of operating systems, including a personal computer operating system, such as a Windows, iOS or Linux, or a mobile operating system, such as iOS, Android, or Windows Mobile, or the like. The client device 600 may also include or may execute a variety of possible applications 642 (shown in RAM 632), such as a client software application such as messenger 643, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 600 may also include or execute an application to communicate content, such as, for example, textual content, multimedia content, or the like, which may be stored in data storage 644. A client device may also include or execute an application such as a browser 645 to perform a variety of possible tasks, such as browsing, searching, playing various forms of content, including locally stored or streamed video, or games (such as fantasy sports leagues).

The client device 600 may send or receive signals via one or more interface(s). As shown in this example, the client device 600 may include one or more network interfaces 650. The client device 600 may include an audio interface 652. In addition, the client device 600 may include a display 654 and an illuminator 658. The client device 600 may further include an Input/Output interface 660, as well as a Haptic Interface 662 supporting tactile feedback technology.

The client device 600 may vary in terms of capabilities or features. Claimed subject matter is intended to cover a wide range of potential variations. For example, a cell phone may include a keypad such 656 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 664 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. Based upon the identity of the user, information may be retrieved from the corresponding user profile.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks and magnetic tape; optical media such as CD-ROM disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, implemented at least in part via a processor, comprising:
    obtaining a query data point representing a query object;
    selecting a subset of a plurality of clusters based upon a comparison of a centroid of a cluster of the plurality of clusters to the query data point, wherein the cluster comprises a set of data points;
    communicating an assignment of the subset of the plurality of clusters to a hardware accelerator of a computing device;
    selecting quantization parameters based, at least in part, on a size of shared memory of the hardware accelerator, wherein the quantization parameters comprise:
        a first quantization parameter indicative of a number of coordinates in at least one compressed data point; and
        a second quantization parameter indicative of a subvector length associated with at least one coordinate;
    generating one or more distance tables based, at least in part, on at least one quantization parameter of the quantization parameters, wherein the one or more distance tables store results of computations corresponding to the query data point and the subset of the plurality of clusters;
    storing the one or more distance tables in the shared memory of the hardware accelerator;
    determining a plurality of data points using the one or more distance tables;
    providing one or more query results pertaining to at least a portion of the plurality of data points;
    subdividing a data point in the subset of the plurality of clusters into a plurality of subvectors of the subvector length;
    quantizing the plurality of subvectors to generate a compressed data point having the number of coordinates, wherein a coordinate of the compressed data point corresponds to a subvector of the plurality of subvectors; and
    mapping the plurality of subvectors to one or more coordinates of the compressed data point.

2. The method as recited in claim 1, comprising:
    determining, for each of the subset of the plurality of clusters, a query residual; and
    communicating the query residual for each of the subset of the plurality of clusters to the hardware accelerator.

3. The method as recited in claim 1, wherein the generating the one or more distance tables is performed, at least in part, by a plurality of threads of the hardware accelerator.

4. The method as recited in claim 1, wherein the determining the plurality of data points is performed, at least in part, by a plurality of threads of the hardware accelerator.

5. The method as recited in claim 1, wherein the selecting the quantization parameters is performed, at least in part, by a machine learning process.

6. The method as recited in claim 1, wherein the one or more distance tables include a plurality of distance tables, each of the plurality of distance tables corresponding to a cluster in the subset of the plurality of clusters.

7. The method as recited in claim 6, wherein the hardware accelerator includes a plurality of multiprocessors, the method comprising:
    generating, by each of the plurality of multiprocessors, a corresponding one of the plurality of distance tables.

8. A computer readable storage medium comprising instructions that when executed by a processor perform operations, the operations comprising:
    obtaining a query data point representing a query object;
    selecting a subset of a plurality of clusters based upon a comparison of a centroid of a cluster of the plurality of clusters to the query data point, wherein the cluster comprises a set of data points;
    communicating an assignment of the subset of the plurality of clusters to a hardware accelerator of a computing device;
    selecting quantization parameters based, at least in part, on a size of shared memory of the hardware accelerator, wherein the quantization parameters comprise:
        a first quantization parameter indicative of a number of coordinates in at least one compressed data point; and
        a second quantization parameter indicative of a subvector length associated with at least one coordinate;
    generating one or more distance tables based, at least in part, on at least one quantization parameter of the quantization parameters, wherein the one or more distance tables store results of computations corresponding to the query data point and the subset of the plurality of clusters;
    storing the one or more distance tables in the shared memory of the hardware accelerator;
    determining a plurality of data points using the one or more distance tables;
    providing one or more query results pertaining to at least a portion of the plurality of data points;
    subdividing a data point in the subset of the plurality of clusters into a plurality of subvectors of the subvector length;
    quantizing the plurality of subvectors to generate a compressed data point having the number of coordinates, wherein a coordinate of the compressed data point corresponds to a subvector of the plurality of subvectors; and
    mapping the plurality of subvectors to one or more coordinates of the compressed data point.

9. The computer readable storage medium as recited in claim 8, the operations comprising:
    determining, for each of the subset of the plurality of clusters, a query residual; and
    communicating the query residual for each of the subset of the plurality of clusters to the hardware accelerator.

10. The computer readable storage medium as recited in claim 8, wherein the generating the one or more distance tables is performed, at least in part, by a plurality of threads of the hardware accelerator.

11. The computer readable storage medium as recited in claim 8, wherein the determining the plurality of data points is performed, at least in part, by a plurality of threads of the hardware accelerator.

12. The computer readable storage medium as recited in claim 8, wherein the selecting the quantization parameters is performed, at least in part, by a machine learning process.

13. The computer readable storage medium as recited in claim 8, wherein the one or more distance tables include a plurality of distance tables, each of the plurality of distance tables corresponding to a cluster in the subset of the plurality of clusters.

14. The computer readable storage medium as recited in claim 13, wherein the hardware accelerator includes a plurality of multiprocessors, the operations comprising:
   generating, by each of the plurality of multiprocessors, a corresponding one of the plurality of distance tables.

15. A system comprising:
   a processor; and
   memory comprising instructions that when executed by the processor perform operations, the operations comprising:
      obtaining a query data point representing a query object;
      selecting a subset of a plurality of clusters based upon a comparison of a centroid of a cluster of the plurality of clusters to the query data point, wherein the cluster comprises a set of data points;
      communicating an assignment of the subset of the plurality of clusters to a hardware accelerator of a computing device;
      selecting quantization parameters based, at least in part, on a size of shared memory of the hardware accelerator, wherein the quantization parameters comprise:
         a first quantization parameter indicative of a number of coordinates in at least one compressed data point; and
         a second quantization parameter indicative of a subvector length associated with at least one coordinate;
      generating one or more distance tables based, at least in part, on at least one quantization parameter of the quantization parameters, wherein the one or more distance tables store results of computations corresponding to the query data point and the subset of the plurality of clusters;
      storing the one or more distance tables in the shared memory of the hardware accelerator;
      determining a plurality of data points using the one or more distance tables;
      providing one or more query results pertaining to at least a portion of the plurality of data points;
      subdividing a data point in the subset of the plurality of clusters into a plurality of subvectors of the subvector length;
      quantizing the plurality of subvectors to generate a compressed data point having the number of coordinates, wherein a coordinate of the compressed data point corresponds to a subvector of the plurality of subvectors; and
      mapping the plurality of subvectors to one or more coordinates of the compressed data point.

16. The system as recited in claim 15, the operations comprising:
   determining, for each of the subset of the plurality of clusters, a query residual; and
   communicating the query residual for each of the subset of the plurality of clusters to the hardware accelerator.

17. The system as recited in claim 15, wherein the generating the one or more distance tables is performed, at least in part, by a plurality of threads of the hardware accelerator.

18. The system as recited in claim 15, wherein the determining the plurality of data points is performed, at least in part, by a plurality of threads of the hardware accelerator.

19. The system as recited in claim 15, wherein the selecting the quantization parameters is performed, at least in part, by a machine learning process.

20. The system as recited in claim 15, wherein the one or more distance tables include a plurality of distance tables, each of the plurality of distance tables corresponding to a cluster in the subset of the plurality of clusters.

21. The system as recited in claim 20, wherein the hardware accelerator includes a plurality of multiprocessors, the operations comprising:
   generating, by each of the plurality of multiprocessors, a corresponding one of the plurality of distance tables.

22. The system as recited in claim 15, wherein the hardware accelerator comprises a graphics processing unit (GPU).

* * * * *